United States Patent [19]

Lee et al.

[11] Patent Number: 5,658,062
[45] Date of Patent: Aug. 19, 1997

[54] LIGHT AMOUNT CONTROLLING APPARATUS AND METHOD FOR PROJECTOR

[75] Inventors: Nam Su Lee; Myung Keun Yeo; Sang Jae Lee; Joong In Shin, all of Kyungki-do, Rep. of Korea

[73] Assignee: LG Electronics Inc., Seoul, Rep. of Korea

[21] Appl. No.: 532,322

[22] Filed: Sep. 22, 1995

[30] Foreign Application Priority Data

Sep. 23, 1994 [KR] Rep. of Korea .................. 24016/1994

[51] Int. Cl.$^6$ ..................................................... G03B 21/14
[52] U.S. Cl. ............................................. 353/85; 353/101
[58] Field of Search ............................ 353/85, 101, 100, 353/69

[56] References Cited

U.S. PATENT DOCUMENTS

| | | |
|---|---|---|
| 3,833,297 | 9/1974 | Swartz ........................ 353/85 |
| 4,278,334 | 7/1981 | Maeda ........................ 353/85 |
| 4,964,719 | 10/1990 | Tachikawa et al. ............ 353/85 |
| 5,136,397 | 8/1992 | Miyashita .................... 353/85 |
| 5,315,334 | 5/1994 | Inana ......................... 354/219 |

FOREIGN PATENT DOCUMENTS 2827174  1/1980  Germany ..................... 353/85

*Primary Examiner*—William Dowling
*Attorney, Agent, or Firm*—Morgan, Lewis and Bockius, LLP

[57] ABSTRACT

A light amount controlling apparatus includes a light source for producing light and a light source driver for driving the light source. A zoom lens unit includes a zoom lens for varying an angle of projection of the light, and a zoom lens position detector detects a position of the zoom lens. A memory stores control data corresponding to the position of the zoom lens and a memory controller reads the control data from the memory according to a detected value of the zoom lens position of the zoom lens position detector. A controller controls the light source driver to vary an amount of light projected from the light source in accordance with the control data output from the memory controller.

8 Claims, 7 Drawing Sheets

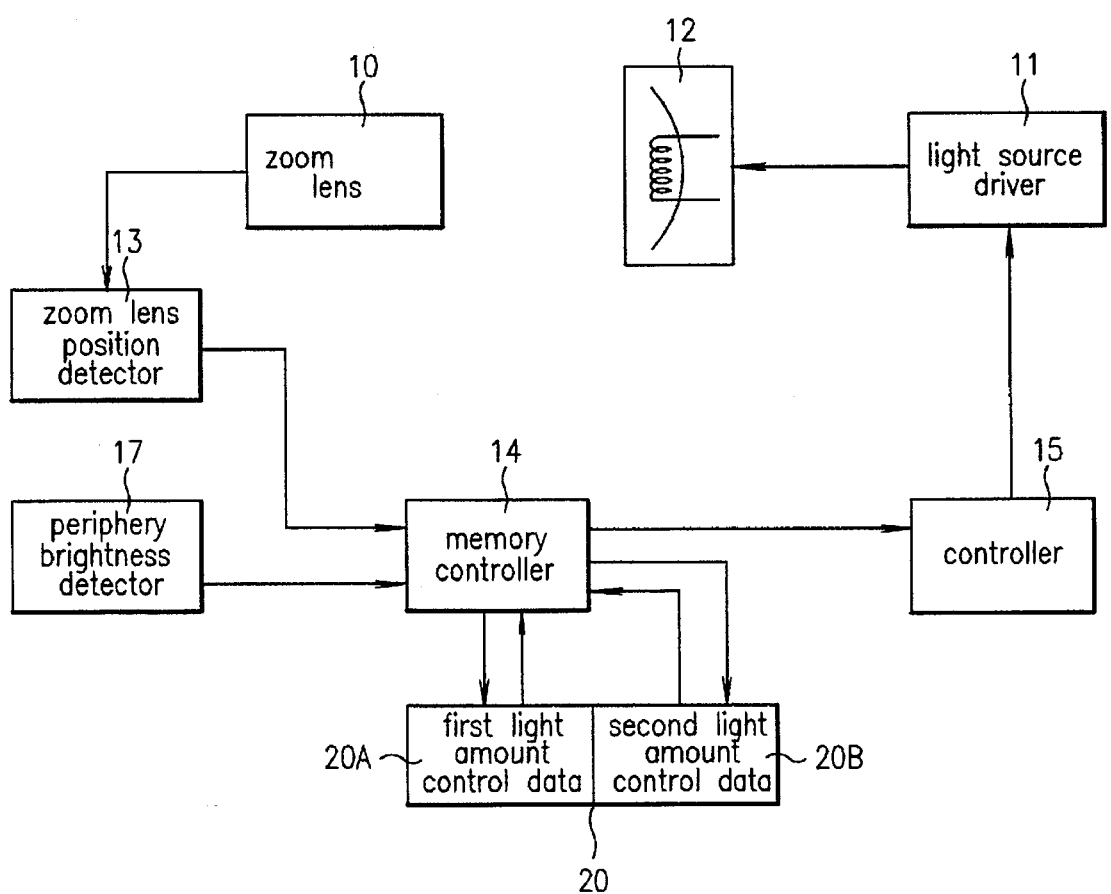
F I G.2B

F I G.4A
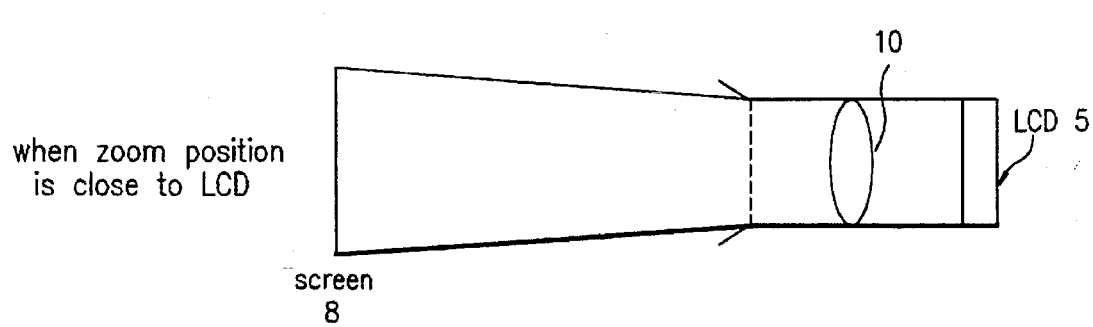
F I G.4B
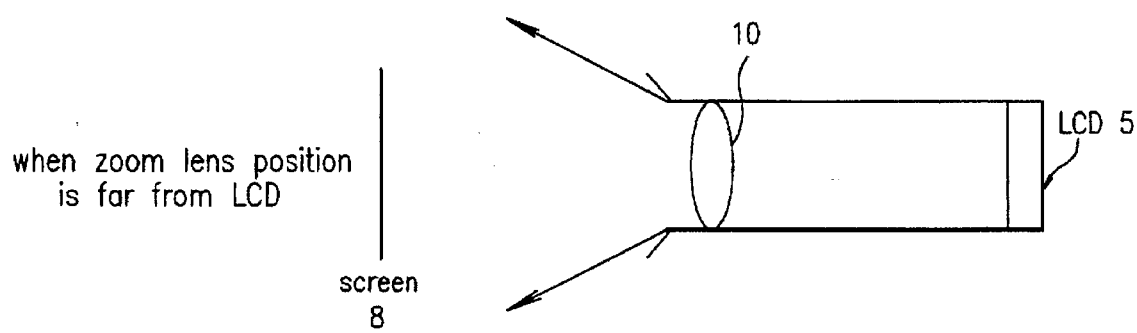

F I G.5
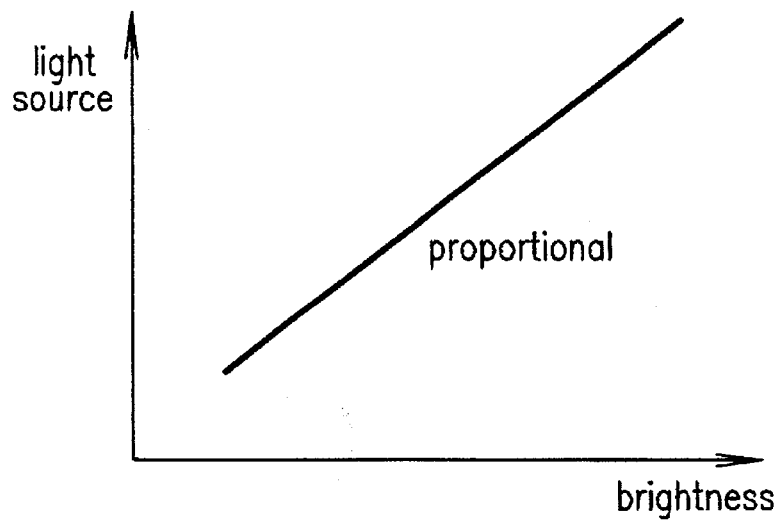
F I G.6
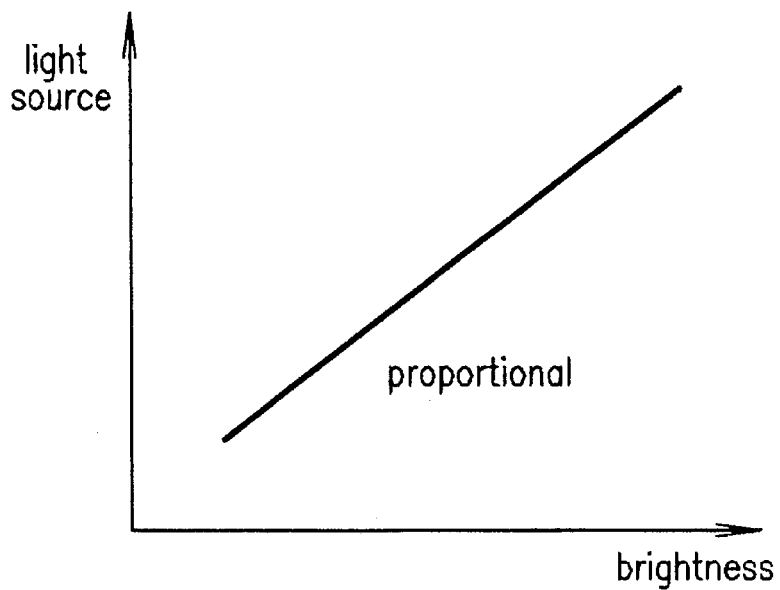

LIGHT AMOUNT CONTROLLING APPARATUS AND METHOD FOR PROJECTOR

BACKGROUND OF THE INVENTION

1. Field of the Invention

The present invention relates to a light controlling apparatus and method, and more particularly, to a light controlling apparatus and method for a projector for maintaining a constant luminance level on a display screen.

2. Discussion of the Related Art

Generally, as shown in FIG. 1A, a projector includes a light source driver 1 for driving a light source according to an input control signal CS, a light source 2 having a lamp driven by light source driver 1 and for irradiating a strong light for displaying an image. A converging lens 3 is positioned in front of light source 2 for converging the light irradiated from light source 2. A first polarizing plate 4 is positioned in front of converging lens 3 for initially polarizing the irradiated light. An LCD 5 is positioned near the front of first polarizing plate 4 for displaying an image according to an input video signal. A second polarizing plate 6 is positioned near the front of LCD 5 for subsequently polarizing the light irradiated through LCD 5. A projection lens 7 is positioned in front of second polarizing plate 6 for focusing or zooming an image projected through LCD 5 and second polarizing plate 6. A screen 8 displays the image projected through projection lens 7. The operation of such a projector will be discussed below.

According to the input control signal CS, light source driver 1 controls light source 2, which in turn irradiates a strong light. The light irradiated from light source 2 is converged by converging lens 3 which projects the light onto the back of LCD 5 through first polarizing plate 4. Here, according to an externally input video signal, an image is displayed on LCD 5. This displayed image is in turn displayed on screen 8 through second polarizing plate 6 and projection lens 7 from the light projected through first polarizing plate 4.

Projection lens 7 is installed to control the distance from LCD 5. The focusing of an image displayed on external screen 8 is performed by controlling the distance from projection lens 7.

As shown in FIG. 1B, the angle of light of the image displayed on screen 8 is varied as projection lens 7 is zoomed. Therefore, the size of the image displayed on screen 8 varies. In other words, when field of view becomes larger from θ1 to θ2 with projection lens 7 zoomed, the size of the image on screen 8 becomes larger, for example, from size A to size B in FIG. 1B.

However, in the conventional projector, control signal CS applied to light source driver 1 is controlled only by a main function selection mode. Hence, when a user enlarges an image displayed on the screen by zooming, its luminance level decreases to dim the image. In addition, when an image is displayed in a bright periphery or surrounding, the luminance level of the image displayed is relatively decreased to produce a dim image, in accordance with the brightness of the periphery.

SUMMARY OF THE INVENTION

Accordingly, the present invention is directed to a light controlling apparatus and method that substantially eliminate one or more of the problems due to limitations and disadvantages of the related art.

Another object of the present invention is to provide a light controlling apparatus and method for supplying a sharp image by controlling an amount of light projected onto a screen.

Additional features and advantages of the invention will be set forth in the description which follows, and in part will be apparent from the description, or may be learned by practice of the invention. The objectives and other advantages of the invention will be realized and obtained by the apparatus and method particularly pointed out in the written description and claims hereof as well as the appended drawings.

To achieve these and other advantages and in accordance with the purpose of the invention, as embodied and broadly described, a light amount controlling apparatus includes a light source for producing light; a light source driver for driving the light source; a zoom lens unit including a zoom lens for varying an angle of projection of the light; a zoom lens position detector for detecting a position of the zoom lens; a memory for storing control data corresponding to the position of the zoom lens; a memory controller for reading the control data from the memory according to a detected value of the zoom lens position of the zoom lens position detector; and a controller for controlling the light source driver to vary an amount of light projected from the light source in accordance with the control data output from the memory controller.

In another aspect of the present invention, a light amount controlling apparatus includes a light source for producing light; a light source driver for driving the light source; a zoom lens unit including a zoom lens for varying an angle of projection of the light; a zoom lens position detector for detecting a position of the zoom lens; a periphery brightness detector for detecting a periphery brightness when light is projected; a memory for storing first control data corresponding to the position of the zoom lens and second control data corresponding to the current periphery brightness; a memory controller for reading the first and second control data from the memory according to a detected value of the zoom lens position and a detected value of the periphery brightness; and a controller for controlling the light source driver to vary an amount of light projected from the light source in accordance with the first and second control data output from the memory controller.

In another aspect of the present invention, a method for controlling light amount for a projector includes the steps of providing a light source for producing light; projecting light from the light source through a zoom lens; detecting a position of the zoom lens; storing control data in a memory corresponding to the detected zoom lens position; reading the control data from the memory in accordance with a detection value of the position of the zoom lens; and varying a light amount from the light source in accordance with the control data.

In a further aspect of the present invention, a memory for controlling light amount for a projector includes the steps of providing a light source for producing light; projecting light from the light source through a zoom lens; detecting a position of the zoom lens and a periphery brightness; storing first and second control data in a memory corresponding to the detected zoom lens position and periphery brightness, respectively; reading the first and second control data from the memory in accordance with a detection values of the position of the zoom lens and the periphery brightness; and varying a light amount from the light source according to the first and second control data.

It is to be understood that both the foregoing general description and the following detailed description are exemplary and explanatory and are intended to provide further explanation of the invention as claimed.

BRIEF DESCRIPTION OF THE DRAWINGS

The accompanied drawings are included to provide a further understanding of the invention and are incorporated in and constitute a part of this specification, illustrate several embodiments of the invention and together with the description served to explain the principles of the invention.

In the drawings,

FIG. 2B is a block diagram of a light amount controlling apparatus for a projector according to a second embodiment of the present invention;

FIGS. 4A and 4B illustrate the relationship between the zoom position, the distance from the LCD, and the angle of light in FIGS. 2A and 2B;

FIG. 5 shows the relationship between the light source and zoom position in FIGS. 2A and 2B;

FIG. 6 shows the relationship between the light source and peripheral luminance in FIGS. 2A and 2B;

DETAILED DESCRIPTION OF THE INVENTION

In the present invention, a light controlling apparatus for a projector includes a zoom lens unit having a zoom lens for varying the angle of light of projected light and a zoom lens position detector for detecting the position of the zoom lens. A memory stores light amount control data corresponding to the position of the zoom lens and a memory controller reads the light amount control data from the memory according to the detected value of the zoom lens position. A controller controls the amount of light in accordance with the light amount control data output from the memory controller and a light source driver drives a light source so that the amount of projected light is varied with the control of the controller.

In another embodiment of the invention, a light amount controlling apparatus for a projector includes a zoom lens unit having a zoom lens for varying the angle of light of projected light and a zoom lens position detector for detecting the position of the zoom lens. A periphery brightness detector detects the current periphery brightness when light is projected. A memory stores first light amount control data corresponding to the position of the zoom lens and second light amount control data corresponding to the periphery brightness. A memory controller reads the first and second light amount control data from the memory according to the detected value of the zoom lens position and the detected value of periphery brightness. A controller controls the amount of light in accordance with the first and second light amount control data output from the memory controller and a light source driver drives a light source so that the amount of projected light is varied with the control of the controller.

The present invention also includes a method for controlling a light amount for a projector including the steps of detecting the position of a zoom lens included in a projection lens for projecting light from a light source; reading out previously stored light amount control data from a memory according to the detected zoom lens position value; and varying the light amount of the light source in accordance with the read light amount control data.

The present invention further includes another method for controlling a light amount for a projector including the steps of detecting the position of a zoom lens included in a projection lens for projecting light from a light source and the current periphery brightness; reading out previously stored first and second light amount control data from a memory according to the detected zoom lens position and periphery brightness values; and varying the light amount of the light source according to the read first and second light amount control data.

Reference will now be made in detail to the present preferred embodiments of the invention, examples of which are illustrated in the accompanying drawings.

Figure 1A:
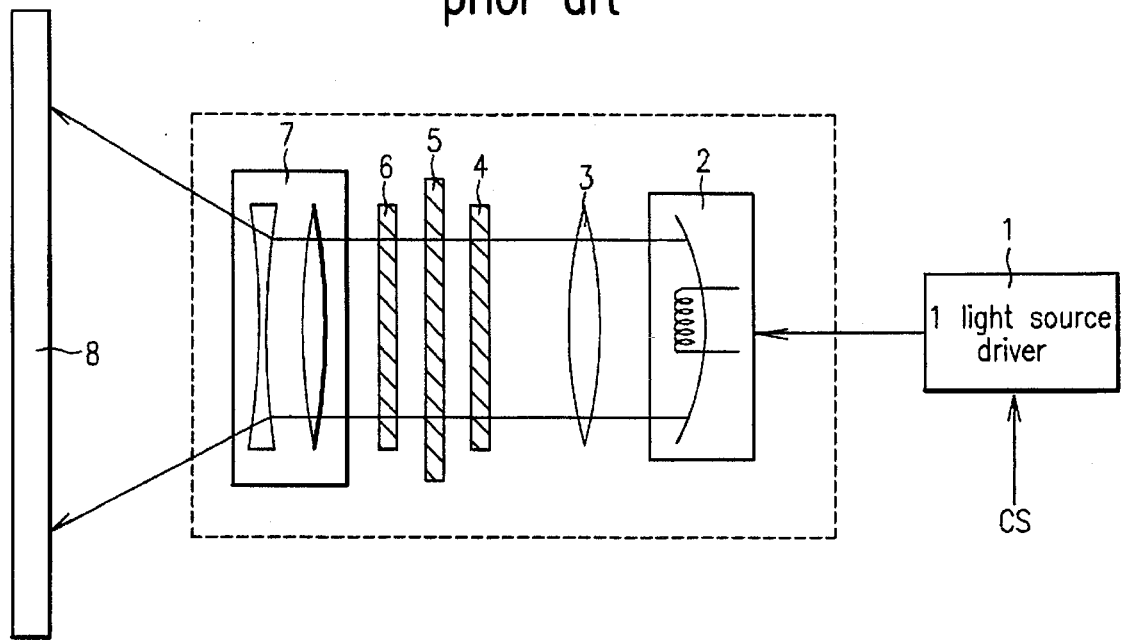
FIG. 1A is a sectional view of a general projector.
Figure 1B:
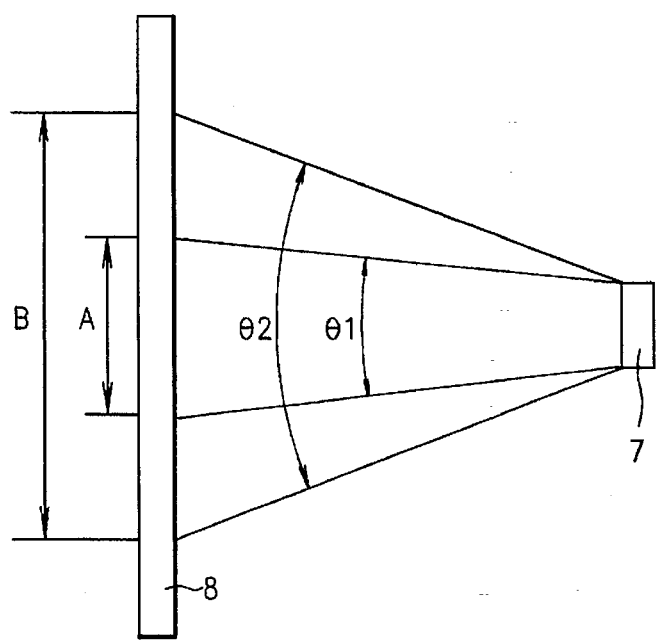
FIG. 1B illustrates the size of a screen in accordance with the angle of light of the general projector.
Figure 2A:
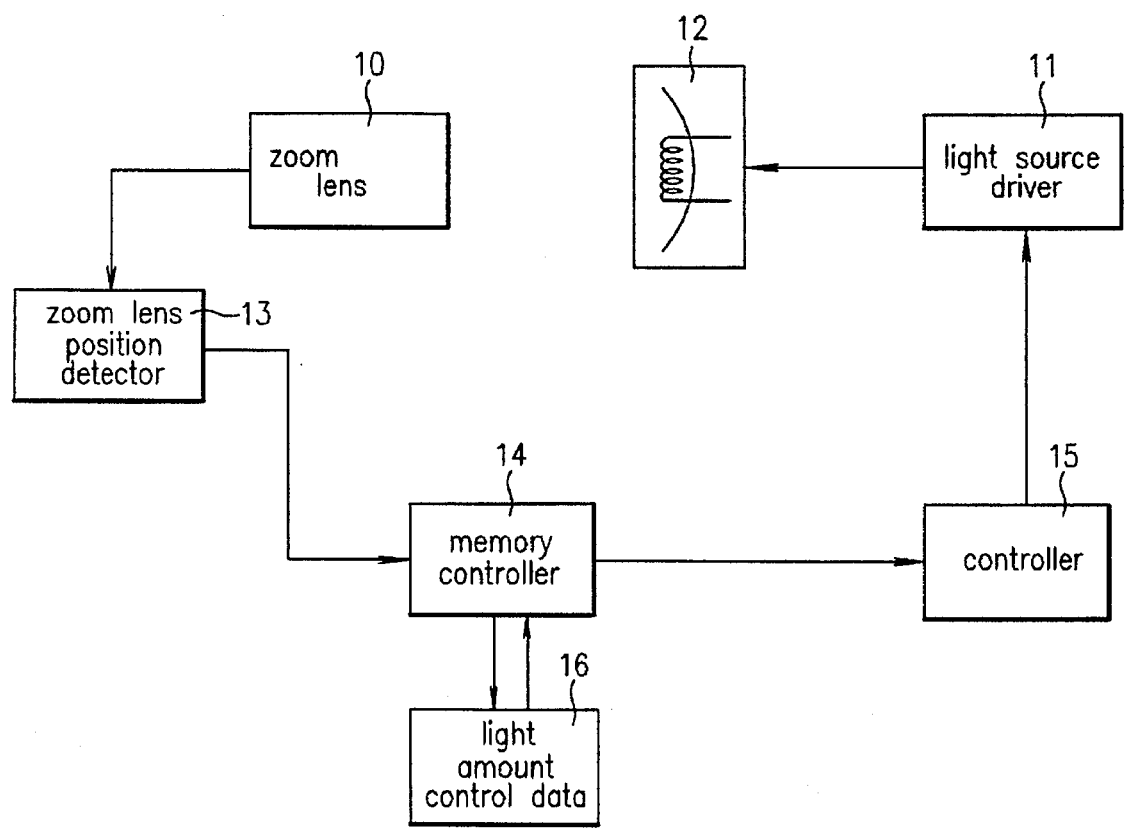
FIG. 2A is a block diagram of a light amount controlling apparatus for a projector according to a first embodiment of the present invention.

Referring to FIG. 2, an embodiment of the light amount controlling apparatus for a projector of the present invention includes a zoom lens unit 10, zoom lens position detector 13, memory controller 14, controller 15, and memory 16.

Figure 3:
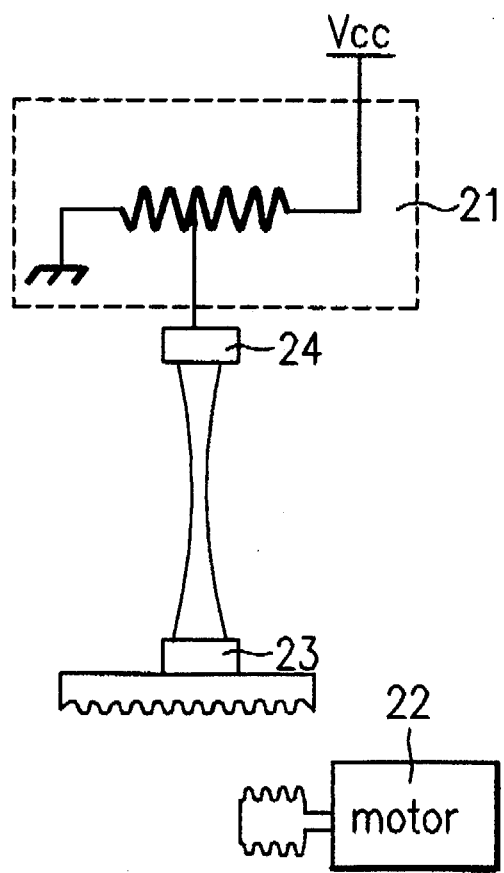
FIG. 3. is a circuit diagram of a zoom lens and a zoom lens position detector of FIGS. 2A and 2B.

Zoom lens unit 10 includes a zoom lens for varying the angle of projected light. Zoom lens position detector 13 detects the position of the zoom lens. More specifically, as shown in FIG. 3, the detector has a variable resistor 21 that is coupled to a support 24 of zoom lens 23 and has a resistance that is varied corresponding to the movement of support 24 in accordance with the zooming of zoom lens 23.

Memory 16 stores light amount control data corresponding to the position of the zoom lens. Memory controller 14 reads the light amount control data from the memory according to the value of the zoom lens position detected by zoom lens position detector 13.

Controller 15 controls the amount of light in accordance with the light amount control data output from the memory controller 14. Light source driver 11 drives the light source so that the amount of projected light is varied in response to controller 15.

The operation of the first embodiment of the light amount controlling apparatus for a projector of the present invention will be described below.

Zoom lens unit 10 is constructed to control the distance from the LCD, that is, zoom position, to allow focusing of an image displayed on the external screen. Here, the amount of light must be controlled because the luminance of the screen varies with zoom position.

As a motor 22 moves in FIG. 3, support 24 of zoom lens 23 also moves to zoom light. Accordingly, variable resistor 21 changes its resistance, so that zoom lens position detector 13 outputs a signal indicative of the current zoom lens position. The detected value of zoom lens position output from zoom lens position detector 13 is input to memory controller 14.

Memory controller 14 reads the light amount control data from memory 16 according to the detected value of the zoom lens position output from zoom lens position detector 13. Here, memory 16 stores light amount control data corresponding to the zoom lens position so that memory controller 14 reads the light amount control data from memory 16 according to the detected value of the zoom lens position. In other words, the light amount control data corresponding to the zoom lens position is mapped in memory 16 so that memory controller 14 reads the light amount control data corresponding to the detected value of the zoom lens position output from zoom lens position detector 13. The data is then output to controller 15.

The light amount control data output from memory controller 14 is input to controller 15 in order to control the driving of the light source by light source driver 11. Accordingly, the amount of light projected from light source 12 is controlled.

A second embodiment of the invention will now be described where like or similar parts are identified throughout the drawings by the same reference characters.

In the second embodiment of the present invention, light amount controlling apparatus includes a periphery brightness detector 17 in addition to the first embodiment including a zoom lens unit 10, zoom lens position detector 13, memory controller 14, controller 15, and memory 20.

Zoom lens unit 10 includes a zoom lens for varying the angle of projected light. Zoom lens position detector 13 detects the position of the zoom lens. More specifically, the detector has a variable resistor 21 which is coupled to a support 24 of zoom lens 23 and has a resistance that is varied with the movement of support 24 in accordance with the zooming of zoom lens 23. Periphery brightness detector 17 detects the current periphery brightness when light is projected.

Memory 20 stores first light amount control data 20A corresponding to the position of the zoom lens and second light amount control data 20B corresponding to the periphery brightness. Memory controller 14 reads the first and second light amount control data from memory 20 according to the detected value of the zoom lens position from zoom lens position detector 13 and the detected value of the periphery brightness from periphery brightness detector 17.

Controller 15 controls the amount of light in accordance with the first and second light amount control data output from memory controller 14. Light source driver 11 drives the light source so that the amount of projected light is varied in response to controller 15.

The operation of the second embodiment of the light amount controlling apparatus of the present invention is similar to that of the first embodiment.

In the second embodiment, memory 20 stores the first light amount control data 20A corresponding to the zoom lens position and second light amount control data 20B corresponding to the periphery brightness. Memory controller 14 reads the first and second light amount control data from memory 20 according to the detected value of the zoom lens position output from zoom lens position detector 13 and the periphery brightness from periphery brightness detector 17. Accordingly, memory 20 is divided into two sections. The first light amount control data 20A corresponding to zoom lens position is mapped in one section and the second light amount control data 20B corresponding to periphery brightness is mapped in the other section. Memory controller 14 reads the first light amount control data 20A and the second light amount control data 20B, and outputs them to controller 15.

The first and second light amount control data output from memory controller 14 are input to controller 15 in order to control the driving of the light source by light source driver 11. Accordingly, the amount of light projected from light source 12 is controlled.

The principle of the above-explained operation will be described with reference to FIGS. 4A, 4B, and 5.

First, when the zoom lens is placed close to the LCD, as shown in FIG. 4A, the angle of projected light becomes smaller because the position of the zoom lens is closer to the LCD. In this situation, the image projected onto the screen becomes smaller and has a high density to thus increase its luminance. Here, the intensity of light projected from light source 12 must be reduced.

For this purpose, memory controller 14 outputs light amount control data in accordance with the position of the zoom lens. Then, controller 15 outputs a light amount control signal to light source driver 11, reducing the intensity of light projected from light source 12.

When the zoom lens is placed far from the LCD, however, as shown in FIG. 4B, the angle of projected light becomes larger because the position of the zoom lens 10 is farther from the LCD. In this situation, the image projected onto the screen becomes larger and has a low density to thus decrease its luminance. Here, the intensity of light projected from light source 12 must be increased.

For this purpose, memory controller 14 outputs the light amount control data in accordance with the position of the zoom lens. Then, controller 15 outputs a light amount control signal to light source driver 11, increasing the intensity of light projected from light source 12.

Accordingly, the light source and the position of the zoom lens are proportional, as shown in FIG. 5. When the zoom lens is far from the LCD and thus the detected value of the zoom lens position is large, the intensity of light projected from light source 12 becomes stronger. When the zoom lens is close to the LCD and thus the detected value of the zoom lens position is small, the intensity of light projected from light source 12 becomes weaker.

Now, the operation for controlling the light amount after detecting a periphery brightness will be described below.

The periphery luminance about the screen on which an image is displayed is detected by a light sensor installed in periphery brightness detector 17 and output to memory controller 14. Memory controller 14 reads the second light amount control data 20B corresponding to the detected value of the periphery brightness and outputs the data to controller 15.

The second light amount control data 20B output from memory controller 14 is input to controller 15 so that a control signal for controlling the amount of light is output from light source driver 11. Thus, the intensity of light projected from light source 12 is controlled.

The principle of this operation will be described with reference to FIG. 6.

When the periphery of the screen becomes brighter, the image displayed on the screen becomes darker and dim. Conversely, when the periphery of the screen becomes darker, the luminance of the image displayed on the screen becomes higher and the image becomes sharper. However, this may cause problems when viewing the image on the screen. Therefore, the luminance of the image displayed and the periphery brightness must be adjusted appropriately.

Accordingly, when the periphery brightness is high, the luminance of the image displayed on the screen must be relatively high to increase the intensity of light projected from light source 12. When the periphery brightness is low, however, the luminance of the image displayed on the screen must be relatively low to decrease the intensity of light projected from light source 12. The light source and periphery luminance are proportional, as shown in FIG. 6, so that for high periphery brightness, the intensity of light projected from light source becomes relatively higher. For low periphery brightness, the intensity of light projected from light source 12 becomes relatively lower.

Figure 7:
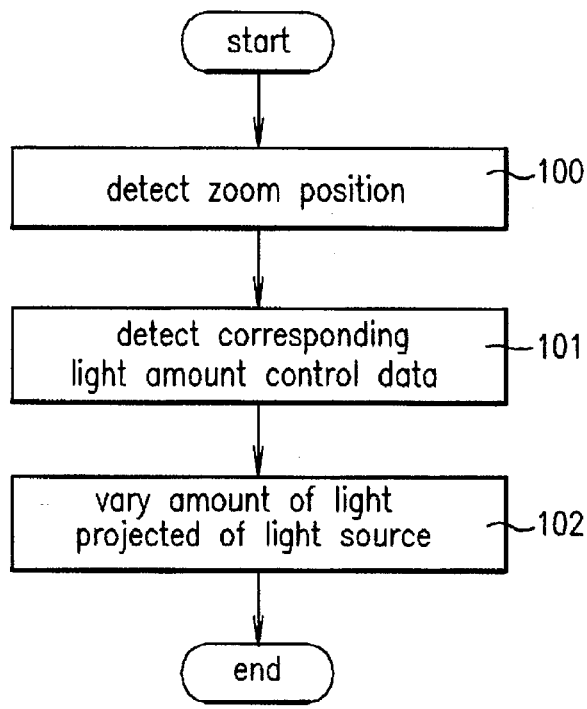
FIG. 7 shows a flowchart for controlling the amount of light from a projector according to a method of the present invention.

Referring to FIG. 7, a method for controlling a light amount of a projector of the present invention includes zoom position detection (step 100), light amount controlling data reading (step 101), and projected light amount variation (step 102).

In step 100, the position of the zoom lens in the projection lens for projecting light from the light source is detected. In this step, the detected value of the zoom lens position is used to read the light amount control data previously stored in step 101 from the memory.

In step 102, the light amount of the light source is varied with the light amount control data read from step 101.

Figure 8:
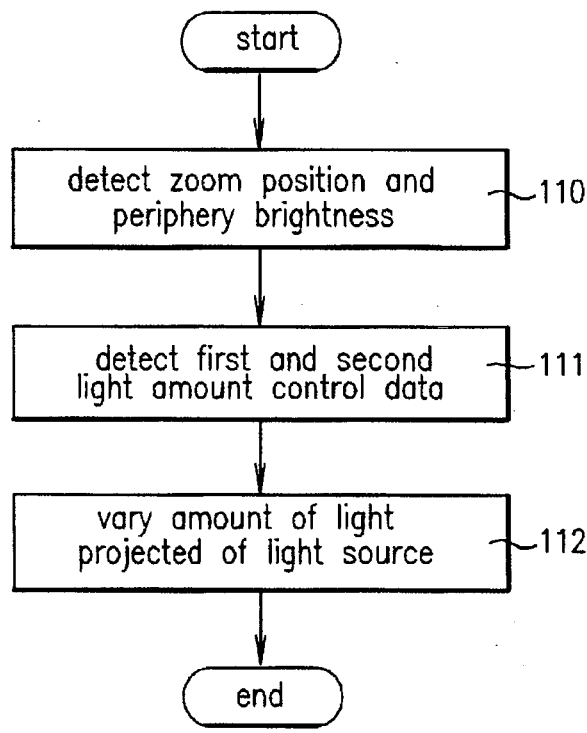
FIG. 8 shows a flowchart for controlling the amount of light from a projector according to another method of the present invention.

Referring to FIG. 8, another method for controlling a light amount of a projector of the present invention includes zoom position and periphery brightness detection (step 110), first and second light amount control data detection (step 111), and projected light amount variation (step 112).

In step 110, the position of the zoom lens in the projection lens for projecting light from the light source and the current periphery brightness are detected. In this step, the detected value of the zoom lens position is used to detect the first light amount control data previously stored in step 111 from the memory. The detected value of the periphery brightness is used to detect the second light amount control data previously stored in step 111 from the memory.

The first and second light amount control data read from step 111 is used to vary the light amount of the light source in step 112. In other words, when the detected value of the zoom lens position is large, the light amount projected from the light source becomes large, and vise versa. For a high periphery brightness, the amount of light becomes large in the light source, and vise versa.

As described above, in the present invention, the position of the zoom lens and the periphery brightness are detected to optimally control the brightness of a display screen. Therefore, the screen maintains a constant luminance independent of the size of the screen or periphery brightness. Hence, an image displayed is sharp to enhance the displaying characteristic of a projector.

It will be apparent to those skilled in the art that various modifications and variations can be made in the light amount controlling apparatus and method of the present invention without departing from the spirit or scope of the invention. For example, the relationship between the light source and the position of the zoom lens (as in FIG. 5) or the periphery luminance (as in FIG. 6) need not be linear. Other non-linear relationships are contemplated by the present invention. Thus, it is intended that the present invention cover the modifications and variations of this invention provided they come within the scope of the appended claims and their equivalents.

What is claimed is:

1. A light amount controlling apparatus comprising:
   a light source for producing light;
   a light source driver for driving the light source;
   a zoom lens unit including a zoom lens for varying an angle of projection of the light;
   a zoom lens position detector for detecting a position of the zoom lens;
   a memory for storing control data corresponding to the position of the zoom lens;
   a memory controller for reading the control data from the memory according to a detected value of the zoom lens position of the zoom lens position detector; and
   a controller for controlling the light source driver to vary an amount of light projected from the light source in accordance with the control data output from the memory controller.

2. A light amount controlling apparatus according to claim 1, wherein the zoom lens unit further includes a zoom lens support, and the zoom lens position detector includes a variable resistor coupled to the zoom lens support, the variable resistor having a resistance that varies in accordance with movement of the support as the zoom lens is zoomed.

3. A light amount controlling apparatus according to claim 1, wherein the controller controls an amount of projected light.

4. A light amount controlling apparatus comprising:
   a light source for producing light;
   a light source driver for driving the light source;
   a zoom lens unit including a zoom lens for varying an angle of projection of the light;
   a zoom lens position detector for detecting a position of the zoom lens;
   a periphery brightness detector for detecting a periphery brightness when light is projected;
   a memory for storing first control data corresponding to the position of the zoom lens and second control data corresponding to the current periphery brightness;
   a memory controller for reading the first and second control data from the memory according to a detected value of the zoom lens position and a detected value of the periphery brightness; and
   a controller for controlling the light source driver to vary an amount of light projected from the light source in accordance with the first and second control data output from the memory controller.

5. A light amount controlling apparatus according to claim 4, where the zoom lens unit further includes a zoom lens support, and the zoom lens position detector include a variable resistor coupled to the zoom lens support, the variable resistor having a resistance, that varies in accordance with movement of the support as the zoom lens is zoomed.

6. A light amount controlling apparatus according to claim 4, wherein the controller controls an amount of projected light.

7. A method for controlling light amount for a projector comprising of steps of:
   providing a light source for producing light;
   projecting light from the light source through a zoom lens;
   detecting a position of the zoom lens;
   storing control data in a memory corresponding to the detected zoom lens position;
   reading the control data from the memory in accordance with a detected value of the position of the zoom lens; and
   varying a light amount from the light source in accordance with the control data.

8. A memory for controlling light amount for a projector comprising the steps of:
   providing a light source for producing light;

projecting light from the light source through a zoom lens;

detecting a position of the zoom lens and a periphery brightness;

storing first and second control data in a memory corresponding to the detected zoom lens position and periphery brightness, respectively;

reading the first and second control data from the memory in accordance with detected values of the position of the zoom lens and the periphery brightness; and varying a light amount from the light source according to the first and second control data.

* * * * *